United States Patent
Hoffman

(10) Patent No.: US 11,256,720 B1
(45) Date of Patent: Feb. 22, 2022

(54) HIERARCHICAL DATA STRUCTURE HAVING TIERED PROBABILISTIC MEMBERSHIP QUERY FILTERS

(71) Applicant: eFolder Inc., Denver, CO (US)

(72) Inventor: Kevin John Hoffman, Denver, CO (US)

(73) Assignee: eFolder Inc., Denver, CO (US)

( * ) Notice: Subject to any disclaimer, the term of this patent is extended or adjusted under 35 U.S.C. 154(b) by 0 days.

(21) Appl. No.: 17/209,818

(22) Filed: Mar. 23, 2021

(51) Int. Cl.
  *G06F 16/28* (2019.01)
  *G06F 16/2455* (2019.01)
  *G06F 16/215* (2019.01)
  *G06F 16/248* (2019.01)
  *G06F 16/242* (2019.01)

(52) U.S. Cl.
  CPC .......... *G06F 16/282* (2019.01); *G06F 16/215* (2019.01); *G06F 16/248* (2019.01); *G06F 16/2445* (2019.01); *G06F 16/24554* (2019.01)

(58) Field of Classification Search
  None
  See application file for complete search history.

(56) References Cited

U.S. PATENT DOCUMENTS

| | | | | |
|---|---|---|---|---|
| 2009/0248886 A1* | 10/2009 | Tan | ................... | H04L 12/1836 709/231 |
| 2014/0281661 A1* | 9/2014 | Milton | ............... | G11C 29/4401 714/2 |
| 2017/0127058 A1* | 5/2017 | Misra | ................... | H04N 19/126 |
| 2019/0129888 A1* | 5/2019 | Bowman | ................ | G06F 3/061 |
| 2020/0042522 A1* | 2/2020 | Zait | ........................ | G06N 7/005 |
| 2020/0211148 A1* | 7/2020 | Mackinnon | ............. | G06T 11/40 |
| 2021/0120307 A1* | 4/2021 | Bastable | ............ | H04N 21/4334 |
| 2021/0149767 A1* | 5/2021 | Edwards | ............... | G06F 16/128 |

OTHER PUBLICATIONS

37089: Acronis Backup Advanced 11.5: Deduplication Best Practices, Available online at <https://kb.acronis.com/content/37089>, (2017), 5 pages.

(Continued)

*Primary Examiner* — Kim T Nguyen
(74) *Attorney, Agent, or Firm* — Invoke

(57) ABSTRACT

In an embodiment, a hierarchical data structure includes data blocks separated into a plurality of data segments partitioned into a plurality of supersegments. Each data segment includes a predetermined number of data blocks. Each supersegment includes a predetermined number of data segments. Responsive to receiving data to store in the hierarchical data structure, a first subset of data segments are grouped into a first supersegment to allow a first portion of the data to be sequentially stored to a first set of data blocks in a first data segment of the first supersegment. Also, a second portion of the data is sequentially stored to a second set of data blocks in a second data segment of the first supersegment. Probabilistic membership query filters are generated at each different level for each data segment and the first supersegment of the hierarchical data structure to allow for efficient search and data retrieval.

30 Claims, 8 Drawing Sheets

(56) References Cited

OTHER PUBLICATIONS

Acronis Duplication in Acronis Backup Advanced, Technical Whitepaper, Acronis 2002-2017, Available online at <https://dl.acronis.com/u/pdf/AcronisBackupDeduplication_technical_whitepaper_en-US.pdf>, 24 pages.

Backup Chain, Veeam Backup Guide for Hyper-V, Available online at <https://helpcenter.veeam.com/docs/backup/hyperv/backup_files.html?ver=100>. Printed on Mar. 23, 2021, 2 pages.

Backup consolidation, available online at <https://www.acronis.com/en-us/support/documentation/AcronisCyberBackup_12.5/index.html#39629.html>, Printed on Mar. 23, 2021, 2 pages.

Chang et al., "Bigtable: A Distributed Storage System for Structured Data," To appear in OSDI 2006, 14 pages.

Chu, "MDB: A Memory-Mapped Database and Backend for OpenLDAP," Available online at <http://www.lmdb.tech/media/20120322-UKUUG-MDB.pdf>, Date Unknown, 66 pages.

Consolidate Backup Images, Available online at <https://support.storagecraft.com/s/article/consolidate-backup-images?language=en_US>, Mar. 30, 2018, 4 pages.

GitHub, Google/leveldb: LevelDB is a fast Key-Value Storage Library Written at Google that Provides an Ordered Mapping from String keys to String Values, available online at <https://github.com/google/leveldb>, Printed on Mar. 23, 2021, 7 pages.

How ShadowProtect Works, Available online at <https://support.storagecraft.com/s/article/how-shadowprotect5-works?language=en_US>, Sep. 13, 2018, 6 pages.

Long-Tenn Retention Policy (GFS), Available online at <https://helpcenter.veeam.com/docs/backup/hyperv/gfs_retention_policy.html?ver=100>, 2021, 2 pages.

Manage Backup Retention and Recover Storage Space (Data Aging), Available online at <https://documentation.commvault.com/commvault/v11/article?p=11904.htm>, Last modified on Apr. 18, 2019, 4 pages.

Partitioned Index Filters, Facebook/Rocksdb Wiki., GitHub, https://github.com/facebook/rocksdb/wiki/Partitioned-Index-Filters, Feb. 3, 2021, 9 pages.

Quest, Sizing and Optimizing the DVM Deduplication Cache (134726), Avaialble online at <https://support.quest.com/kb/134726/sizing-and-optimizing-the-dvm-deduplication-cache>, Printed on Mar. 23, 2021, 4 pages.

Retention Rules, Available online at <https://www.acronis.com/en-us/support/documentation/AcronisCyberBackup_12.5/index.html#38851.html>, The topic was last revised: Feb. 13, 2019, 2 pages.

RocksDB, Wikipedia Encyclopedia, Available online at <https://en.wikipedia.org/wiki/RocksDB>, 2021, 4 pages.

SIRIS, ALTO, and NAS: Explaining the Inverse Chain and Investigating Large Recovery Points, Available online at <https://kb.datto.com/hc/en-us/articles/204239984-SIRIS-ALTO-and-NAS-Explaining-the-Inverse-Chain-and-Investigating-Large-Recovery-Points>, Dec. 11, 2020, 8 pages.

Symas, Lightning Memory-Mapped Database, Symas Corporation, Available online at <https://symas.com/imdb/>, Printed on Mar. 23, 2021, 6 pages.

Synthetic Full Backup—Veeam Backup Guide for Hyper-V, Available online at <https://helpcenter.veeam.com/docs/backup/hyperv/synthetic_full_backup.html?ver=100>, Printedon Mar. 23, 2021, 3 pages.

Tebani et al., "A Proteomics-Based Analysis Reveals Predictive Biological Patterns in Fabry Disease," J. Clin. Med., 2020, 9, 1325, 18 pages.

* cited by examiner

HIERARCHICAL DATA STRUCTURE HAVING TIERED PROBABILISTIC MEMBERSHIP QUERY FILTERS

TECHNICAL FIELD

The disclosure generally relates to key-value database systems, and more particularly to a hierarchical database system having a fixed-number of data key-values with probabilistic membership query filters for each tier with an unlimited number of top-level nodes, allowing storage for an open-ended number of key-value pairs in the database.

BACKGROUND

Data backup systems are configured to store data of a reference system so that should data on the reference system become corrupted, changed without authorization, deleted, locked, or otherwise rendered unacceptable, the data for the reference system may be at least partially replaced using the backup data. A data backup system may copy all of the data of the reference system to create the backup file in one approach. In another approach, an initial backup image of the reference system may be created, and then subsequent backups only store data which has changed between a previous backup and the current state of the data of the reference system, rather than storing a full copy of the data of the reference system during every backup operation. Full copy strategies are both inefficient and costly in terms of system resources.

BRIEF DESCRIPTION OF THE DRAWINGS

Reference symbols in the various drawings that have the same number indicate like elements.

DETAILED DESCRIPTION

Figure 1:
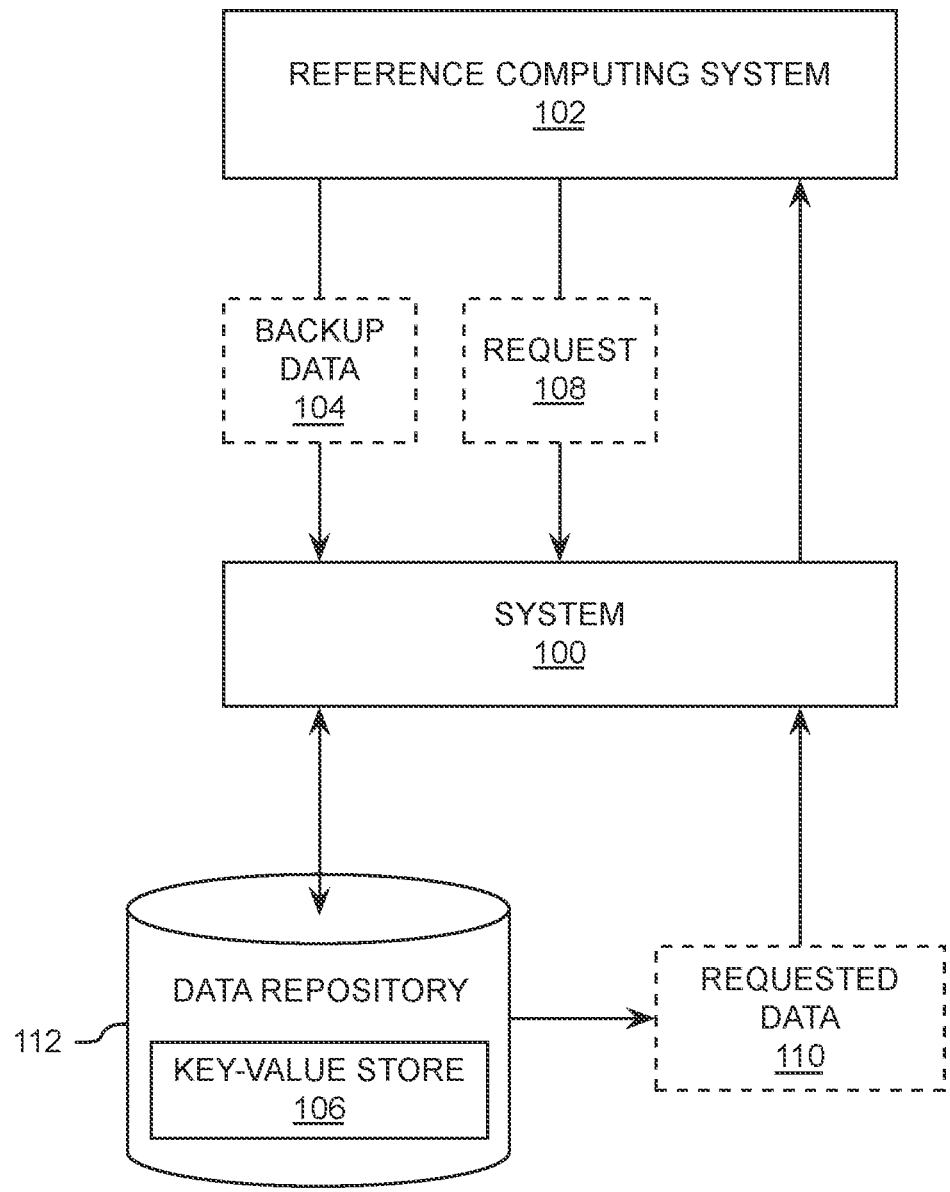
FIG. 1 is a simplified block diagram of an example system for generating and storing backup data for a reference computing system.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. BACKUP DATA STORAGE
2.1 CHAIN OF FILES
2.2 GRANDFATHER/FATHER/SON (GFS)
2.3 DATA SNAPSHOTS
2.4 DATA DEDUPLICATION
3. KEY-VALUE STORE
3.1 HIERARCHICAL DATA STRUCTURE
3.2 CONCURRENT ACCESS
3.3 AUTHORITATIVE BACKUP
4. EXAMPLE EMBODIMENTS
5. MISCELLANEOUS; EXTENSIONS
6. HARDWARE OVERVIEW
7. COMPUTER NETWORKS AND CLOUD NETWORKS

1. General Overview

The descriptions presented herein relay sufficient information to enable a person having ordinary skill in the art to make and use the present invention and are provided in the context and requirements of particular embodiments of the present invention.

One or more embodiments describe a hierarchical data structure which utilizes a plurality of layers, with each layer having simple and testable semantics, that combine together to form a highly scalable data structure. Existence of data at each level in the hierarchical data structure is modeled using probabilistic methods.

In an embodiment, data is stored to the hierarchical data structure in data blocks, with sets of data blocks being stored in corresponding data segments. Multiple data segments are grouped together at a higher level in the hierarchical data structure by a supersegment, with even higher levels of the hierarchical data structure using supersegments which include multiple other supersegments. Each layer has a fixed upper limit on the amount of data blocks that it may include, which provides for RAM-efficient key-existence checks (e.g., for data deduplication and/or data reads) but does not limit total data stored to the hierarchical data structure.

In one embodiment, probabilistic membership query filters are generated for each level of the hierarchical data structure to allow for efficient determination of content for data blocks within (or below) that level. When searching for data that may or may not be stored to the hierarchical data structure, a result of the search may indicate the data is stored to the hierarchical data structure when it is not (i.e., a false positive). The hierarchical data structure, in one or more embodiments, allows for a near-zero false positive rate for searches due to the multi-layered probabilistic membership query filters.

In an embodiment, additional efficiencies are obtained by sealing segments once they have been populated with a predetermined maximum amount of data for the segment. In other words, once data in a certain tier reaches its fixed upper limit of capacity (or upon request before that point is reached), the segment becomes immutable and no further data is written to that segment. However, the data in an immutable segment is still allowed to be read and marked as deleted.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

2. Backup Data Storage

When a backup operation generates backup data to be stored for a reference system, the backup system may use one or more schemes for storing the backup data to one or more storage media. The backup data storage scheme may also dictate how a requesting process may be allowed to access the backup data once it is stored and/or verification processes for ensuring that the backup data is intact and not corrupt. Some example backup data storage schemes are described below.

2.1 Chain of Files

One example scheme stores backup data in a "chain" of files, with each file representing a single backup (an initial full backup is the first file stored, and each subsequent incremental backup is a smaller file and includes only the data which is changed since the last backup). There are a number of techniques for managing and maintaining this chain of files.

One technique relies on maintaining each file in the chain unchanged, e.g., no file in the chain is ever deleted or modified. In this technique, to read the current status and condition for desired data, every file in the chain is checked, starting from the most recently created file (the newest file in the chain) all the way back to the original full backup file (the oldest file in the chain), to determine whether an individual file in the chain contains the desired data. This degrades performance of the backup system dramatically as the length of the chain of files increases, and also increases the risk of data loss. This is because the loss or corruption of any individual file in the chain of files will "break" the chain from that point forward, and cause loss of data for any file created after the breakage in the chain.

Another technique relies on consolidating multiple files in the chain to shorten the length of the chain and number of files. With this technique, data from multiple files in the chain (representing incremental backups) are consolidated into a single file in the chain, representing data for the most recent file out of all of the files consolidated for searching purposes. This consolidation process works by copying the most recent version of any changed data in any of the incremental backup files into a newly consolidated backup file, and then (either immediately or subsequent to creation of the consolidated file) deleting the previous files. For example, a technique may take all incremental backup files generated within a given calendar day (e.g., 24 files representing changes over each hour of a day) and generating a single "end of day" file. The same could be applied for end of week, end of month, etc. This reduces the number of files in the backup chain, mitigating the performance issues of a very long backup chain (described above) as the chain gets longer over time.

Yet another technique relies on "rolling forward" or consolidating the base image (first file created) plus a series of incremental change files into a new base image. Sometimes this is also called a "synthetic backup" or "synthetic consolidation." This technique takes the process described above for consolidation of multiple incremental files, but the consolidation process also includes the very first file in the chain (the "base image"), allowing the base image to move forward in time. Without this technique, all data differences from the point in time when the backup was first taken must be stored, which may have occurred many years in the past, and thus significantly more data may be stored than is needed. For example, if the backup chain was started three years ago, but only 30 days of retention of backups is needed, there is no need to store backups from three years past. Optionally, the consolidated incremental files may be converted into "reverse incremental files" as part of the synthetic rollup, so that restoring to older points in time (which are now representing recovery points before the new consolidated full backup) is still possible until the reverse incremental file is deleted.

2.2 Grandfather/Father/Son (GFS)

Another example scheme for storing backup data is referred to herein as "grandfather/father/son" (GFS). With this technique, instead of a chain of files, a hierarchical "tree" structure of data is maintained. The root node in each tree is called a "grandfather" and represents a full backup. Each "father" node in a particular tree is a child of the lone grandfather node, and represents all of the data differences between the grandfather data image and a point in time when a particular father node is created (in other words, there are no data dependencies between multiple father nodes—each father node may be independently deleted without change to the data in any other father node being needed).

In a similar approach, each "son" node in a particular tree is a child of a corresponding father node and represents all the data differences between the father node and son node. In an approach, a new grandfather node may be created periodically (e.g., every month), with a new father node being created periodically at a more frequent interval (e.g., every week), while a new son node may be created periodically at even more frequent intervals (e.g., every day).

This enhancement provides additional flexibility in how many months/weeks/days/hours/minutes of historical data are retained, and does not rely on a consolidation process, as described above. However, there is a disadvantage to this method, in that multiple full backups (one for each grandfather node) are stored, in addition to adding to the complexity of programming the backup agent to calculate and store the differences between a backup file that was created much farther in the past (and not just the very last, most recent backup file, which is what is used for the chain of files technique).

2.3 Data Snapshots

Yet another example scheme for storing backup data uses snapshot images to identify the differences in data between backups. This technique allows for snapshot semantics, enabling queries over temporal data to be efficiently evaluated. Such a scheme may be implemented through one or more snapshot generation techniques, such as "copy-on-write," where once the initial full backup is written, a snapshot image is taken that preserves the condition of the data at that point in time (e.g., when the snapshot is taken). Thereafter, for each incremental backup, only the changes to the data are written and at the end of the backup operation, another snapshot image is taken. A storage system that implements this snapshot scheme is able to efficiently track and store the differences between (1) the current data on the reference system and the previous snapshot image, and (2) between previous snapshot images.

2.4 Data Deduplication

Another concern for storing backup data arises when generating backup data for a reference system that provides data deduplication. In this case, a backup operation may write a full copy of the data each time, and rely on some system or appliance configured for the deduplication process to track which blocks of data are the same (or duplicates of each other) between different written copies, and ensure that only one copy of this data is actually stored (e.g., deduplicated data). Then, references to the previously-stored data are stored in a backup image, instead of extra copies of the duplicate data. The system also tracks when the last reference to a piece of duplicate data is deleted, so that the actual data that is no longer referenced may also be deleted (this process is called garbage collection). This uses the least amount of storage space, but requires heavy demands on processing resources, e.g., processor cycles, random access memory (RAM) capacity, etc. When the determination is made as to which blocks are duplicated during the backup process itself, it is referred to as inline deduplication. In another example, a chain-based backup may deduplicate data contained within each file in the chain, but not across multiple files in the same chain. This deduplication may occur when each file in the chain is generated, or asynchronously after a given file in the chain has been generated with the duplicate data with the duplicate data later being removed by the asynchronous process.

One or more of the above described schemes for storing backup data may be combined in different tailored or custom backup strategies. An example of one such combination is a GFS system that also uses deduplication so that any data in each full backup included in a grandfather node is not stored more than once in the database, and that incremental backups still only need to process the changed data.

Data deduplication may be used in high-end backup systems that rely on dedicated backup appliances (or other approaches able to dedicate large amounts of resources to the backup process). Low-end systems are typically designed to be resource efficient, but may suffer from disadvantages of chains (e.g., degrading performance over time and risk of data loss) or drawbacks of GFS (e.g., taking and storing a full backup every month, which is both expensive and time consuming, lengthening backup windows).

3. Key-Value Store

One of the methods that may be used to implement part of a data deduplication system is a "key-value store." A key-value store is a database that does not rely on a schema, but instead stores values associated uniquely with a key. These values may then be later accessed in the database responsive to that same key being provided. To use a key-value store to deduplicate data, a hash may be computed over each portion of the data, to form a probabilistically unique key for each portion of the data, which is the value that is stored associated with that key. A determination on how to subdivide the data and how to compute the key values from the data vary by approach. However, using a key-value store in a deduplication system is not without some complications.

It may be difficult to determine how to store the data for the values over time as changes are made. The key/value pairs may be read or written in any order over time, and values may be arbitrarily deleted at any time, so techniques to efficiently determine if a value is stored in the database, and if so, where it is stored and how to retrieve it are factors in how well the system functions.

One approach to address this issue is to use a log-structured merge-tree (LSM), which provides different "tiers" of data values organized in a tree structure, with values being stored in each level of the tree sorted and/or indexed by key. As data is added and the node in the tree receiving the new data exceeds a threshold (e.g., size, number of entries, etc.), then a larger contiguous segment of values is removed from that node and inserted into a parent node or one of its child nodes in the tree. This operation is referred to as "merging" the indexes/keys/values together. In addition, this merge process may recursively trigger several more "merge" operations. This occurs when a merge process moving values from one level to another level results in the target level exceeding its own threshold, which causes additional merge operations to be performed to rectify this condition.

Another operation which may occur in a LSM happens when there are a large number of deletions, resulting in a node in the tree becoming too small or falling below a threshold size. In this case, the node may be, at least partially, consumed by (merged with) another node to maintain the desired threshold size across all the nodes. Nodes may also be merged together to eliminate "tombstone" data (e.g., key-value pairs which have been marked as deleted but are still present on storage).

Another issue that may arise with the LSM approach is "write amplification," where the same key-value pair might be written to storage several times as it is merged across various levels in the tree over time. This limits overall logical write throughput (as a given storage device may have a maximum limit on total write bandwidth), causes additional wear on storage devices with a limited amount of writes over its lifetime (e.g., solid state disks), and consumes additional space and adds complexity related to safely performing merge operations considering all failure conditions (e.g., a system crashing in the middle of merging a segment).

Another issue that may arise in deduplication systems that rely on a key-value store is how to quickly determine if a key is already stored in the database (e.g., a key existence check). Approaches to address this issue vary. One approach uses deterministic key indexes held in RAM, which may authoritatively answer whether or not a key is in the database without having to doublecheck the storage media, which is beneficial for performance but consumes relatively large amounts of RAM. Another approach uses probabilistic set membership data structures, e.g., probabilistic membership query filters or approximate member query (AMQ) filters, which use less RAM, but may provide false positives. Therefore, if the probabilistic membership query indicates that the key might already be in the database, additional searching of data stored to the storage media is needed to verify membership. For large databases (which may have billions or even trillions of keys), this process may slow down the speed at which duplicate data may be deduplicated, sometimes by a factor of one hundred or more. Moreover, overall throughput may be decreased, as writing to the database uses reads to the database to "double check" if the values actually exist already or not. The computing resources required to implement resilient solutions to these challenges are often substantial, leading to situations where deduplication is only applied to a portion of the data (e.g., "WAN optimization" approaches that only deduplicate against a smaller "cache" of commonly seen data) or where deduplication is performed on a separate dedicated computing device (e.g., backup appliance, backup gateway, backup proxy, or within the cloud).

Another issue with data deduplication occurs when multiple users attempt to access and/or modify the database, and concurrent access to the database needs to be implemented in some way. One approach to overcome this issue is to either assume that only a single process is currently modifying the database, or rely on file locking features for the underlying file system. File locking features may lock entire files or portions of files exclusively when writing to certain portions of the database. This avoids conflicts of different processes performing merge operations on the same segment(s) of the tree at the same time, which would cause data corruption, data loss, or other undesirable effects. In order to allow for multiple users to write to the database concurrently, either a client/server approach may be used (with one server running and clients connecting to the server via a network or some other inter-process communication mechanism), or operations on a filesystem may be only be executed with safe and reliable file locking semantics (e.g., a local filesystem).

3.1 Hierarchical Data Structure

FIG. 1 is a simplified block diagram of an example system 100 for generating and storing backup data 104 for a reference computing system 102. System 100 may include one or more processors (not shown) and a data repository 112 where data, such as backup data 104, is stored, and may include a database using a key-value store 106. In one or more approaches, system 100 may be any type of computing device having at least one hardware processor, such as a server device, a host device, an appliance device, an application specific hardware device, etc. In one embodiment, system 100 may be configured to provide a sandbox environment that does not affect or change the software, data, settings, and configurations of reference computing system 102, for example, through use of the Quick EMUlator (QEMU).

In one or more embodiments, a data repository 112 may be included in system 100 for storing data in a database (e.g., storing backup data 104 from reference computing system 102). The database may be organized using a key-value store 106 to allow for fast and efficient retrieval of the stored data. Data repository 112 may include any type of storage unit and/or device (e.g., a file system, database, collection of tables, or any other storage mechanism) for storing data, and may have any number of key-value stores 106 resident thereon. Further, data repository 112 may include multiple different storage units and/or devices. The multiple different storage units and/or devices may or may not be of the same type or located at the same physical site. Further, data repository 112 may be implemented or may execute on the same computing system as system 100. Alternatively or additionally, data repository 112 may be implemented or executed on a computing system separate from system 100. Data repository 112 may be communicatively coupled to system 100 and/or reference computing system 102 via a direct connection, via a wireless connection, via a network, or some other connection that would be apparent to one of ordinary skill in the art.

System 100 is configured to obtain, receive, create, and/or generate backup data 104, which is based on data of reference computing system 102. Backup data 104 is stored in one or more databases using at least one key-value store 106. The database(s) may be stored to data repository 112 in one approach. Moreover, in response to receiving a request 108 for certain data from the database(s), the database is searched via key-value store 106 to determine if and where the certain data is stored in the database(s). Once the requested data 110 is located, it is copied and/or moved, via system 100, to the requesting system (shown as reference computing system 102 in FIG. 1). The use of key-value store 106 is described in more detail below.

System 100 may include one or more graphical user interfaces (GUIs) for implementing various functions, features, processes, operations, etc. These GUIs may be presented on a variety of electronic devices including, but not limited to, web browsers, laptop computers, server computers, backup appliance devices, desktop computers, computer terminals, television systems, tablet computers, smartphones, etc. One or more of these electronic devices may include a touch-sensitive surface and/or display.

System 100 is configured to store data, particularly on low-end hard disk drive devices, allowing new data to be written sequentially to data repository 112 (which may include inexpensive disk media, alone or in combination with other data storage devices) without relying on reading data from the disk media to accomplish the writes (including the operations used to perform deduplication). Moreover, system 100 allows for reading any value previously written to data repository 112 without relying on any additional reads from data repository 112 (e.g., for index searches or lookups, etc.).

In one or more embodiments, system 100 provides extremely fast lookups when key(s) are already stored in the database, while maintaining memory efficient operation compared to conventional database systems. One approach provides this advantage by using a very predictable amount of RAM per terabyte (TB) of user data stored to data repository 112, e.g., less than about 200 megabytes (MB) of RAM per TB of user data stored. It is also possible using system 100 to achieve a known and very accurate false positive rate (e.g., better than $1 \times 10^{-20}$) compared to conventional systems, while deduplicating data at a rate of more than 1 gigabyte (GB)/second per processor core (e.g., 1 GB/sec/CPU core).

Probabilistic membership query filters (e.g., bloom filters, quotient filters, cuckoo filters, etc.) pre-allocate, in advance of their execution, certain internal data structures, leading to a certain amount of RAM for a set of a given size in order to guarantee an upper bound on the possible false positive rate. Therefore, in one or more embodiments, a maximum size of a data segment (e.g., a chunk of data having a predetermined size) may be determined based on a desired false positive rate. Knowing this maximum size allows for a certain amount of space for a probabilistic membership query filter (referred to herein as a data segment "p-index") to be pre-allocated within each data segment based on the desired false positive rate. Moreover, a maximum number of keys that will be inserted in that data segment are also known and space is allocated within the data segment for these keys once the total size of the data segment is determined.

In an embodiment, a "truncated key index" (referred to herein as a data segment "k-index") is also generated for each data segment. A truncated key may utilize a subset of contents of a full key, such as a known pattern of bytes from the key (e.g., odd bytes, even bytes, etc.), the first bytes of the key, the last bytes of the key, etc. Moreover, the truncated key may use a consistent number of the total bytes in the key (e.g., 3 bytes, 4 bytes, 6 bytes, 10 bytes, etc., of a known consistent total key length). Also, the full key value may be any desired length in bytes, to ensure that each full key value is unique within the database or within database partitions (e.g., 16 bytes, 24 bytes, 32-bytes, 48 bytes, etc.).

Each truncated k-index stores a mapping that correlates a truncated key to a data offset in a data file associated with a respective data segment, so that a location for specific data within the data segment may be easily ascertained from the truncated k-index, once a searcher determines which data segment includes the searched-for data.

This approach saves resources, as a much smaller amount of RAM is used for a truncated key index versus a full key value to map the keys that are inserted into a data segment to an offset in the data segment's data file where the data associated with that key is stored.

Because the key value is truncated, it is possible that multiple keys stored in the same data segment will have the same truncated key (e.g., key-prefix, key-suffix, etc.). In this case, when attempting to search for or read such a key, a query will return and/or find multiple key matches in a data segment k-index. In response to finding multiple key matches in the data segment k-index, the query will read the values associated with each key match from data repository 112, consuming additional resources unnecessarily.

In one embodiment, each data segment may be described with a p-index and a k-index. In this way, if a search against one of the indexes reveals ambiguity, another layer having another index exists to reduce the likelihood of a false positive when searching against multiple levels of the hierarchical data structure.

In one embodiment, data values stored to data repository 112 may also store associated keys, allowing a search operation to have access to the full key and discard the value(s) whose data do not match the full key.

To maintain the desired false positive rate, once a data segment is filled with data and reaches the data segment maximum size, additional data is stored in a new data segment. Moreover, inefficiencies are introduced in a 'flat' structure with data segments, each with a fixed number of data blocks, stored across data repository 112 because reading a single value from the database requires that the probabilistic membership query filter for each data segment that exists in the database be queried to find a value. To overcome these inefficiencies, multiple data segments are aggregated into a "supersegment" which includes a variable number of data segments, up to a fixed maximum number based on a number of factors.

In one or more embodiments, a probabilistic membership query filter is pre-allocated for the maximum number of data segments that may be included indirectly inside of each supersegment (i.e., the maximum size of a data segment multiplied by the maximum number of data segments that a supersegment may include). A higher maximum false positive rate is practical for use in these probabilistic membership query filters, because an I/O operation will not be triggered to attempt to retrieve the value from data repository 112 unless it passes through all of the probabilistic membership query filters at all layers of supersegments (plus a final data segment k-index).

Figure 2:
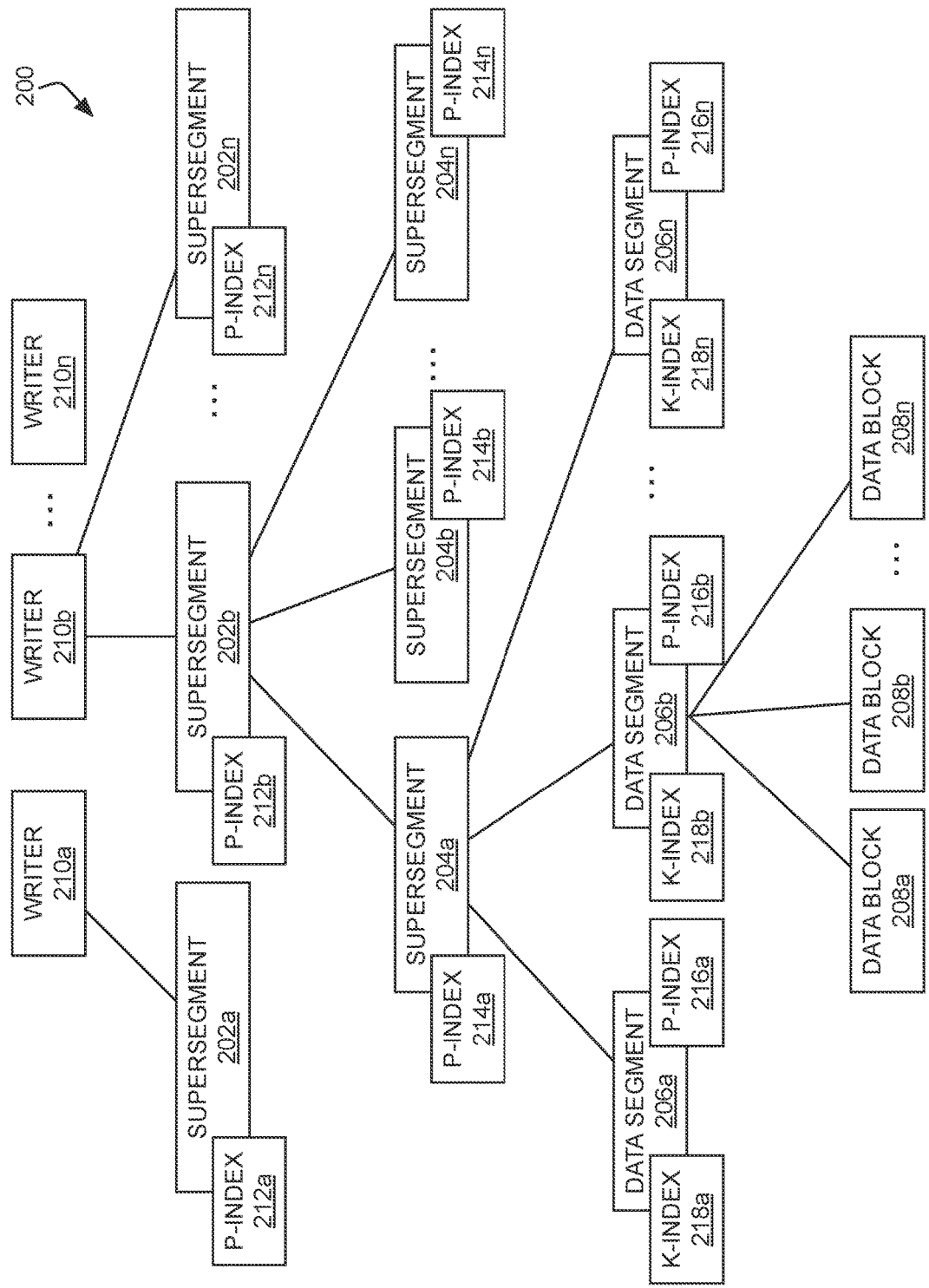
FIG. 2 shows an example hierarchical data structure for use in a key-value store.

FIG. 2 shows an example hierarchical data structure 200 for use in a key-value store according to one or more embodiments. Hierarchical data structure 200 includes a plurality of supersegments 202 (e.g., supersegment 202a, supersegment 202b, . . . , supersegment 202n), a plurality of supersegments 204 (e.g., supersegment 204a, supersegment 204b, . . . , supersegment 204n), a plurality of data segments 206 (e.g., data segment 206a, data segment 206b, . . . , data segment 206n), and a plurality of data blocks 208 (e.g., data block 208a, data block 208b, . . . , data block 208n). Any number of layers of supersegments 202, 204 may be included in hierarchical data structure 200, to accommodate the amount of data which will be stored to the database. Moreover, there is no limit as to how many supersegments 202 may exist at the top layer of the hierarchical data structure 200.

In one embodiment, data blocks 208 in hierarchical data structure 200 may have arbitrary sizes (e.g., data blocks may have any size, and may be non-uniform in size), such that some decision function or algorithm applied over the input data governs how the input data is grouped into one or more data blocks 208 (e.g., data block 208a, data block 208b, . . . , data block 208n). In an embodiment, a decision function may be as simple as a fixed number of bytes being stored to each data block 208. In another embodiment, a decision function may use characteristics of content of the input data itself (e.g., one or more data "fingerprinting" methods) to determine boundaries for the data blocks 208. Input data, in an embodiment, may be written sequentially to data blocks 208 on any type of media, such as disk media, optical drive media, tape media, non-volatile random access memory (NVRAM), etc.

In an embodiment, a particular supersegment may include other supersegments (e.g., supersegment 202b stores supersegments 204a, 204b, . . . , 204n) with the number of supersegments which may be included in a single supersegment being determined based on one or more factors described below. In another embodiment, a particular supersegment may include a set number of data segments 206 (e.g., supersegment 204a stores data segments 206a, 206b, . . . , 206n). A determination as to how many supersegments 204 to include in any one supersegment 202 is based on one or more factors described below. Also, a determination as to how many data segments 206 to include in any one supersegment 204 may be based on the same factors, or one or more different factors. Each data segment 206 includes up to a fixed maximum number of data blocks 208 (e.g., data segment 206b includes data blocks 208a, 208b, . . . , 208n) based on the same factors, or one or more different factors.

Determinations as to how many elements (e.g., supersegments, data segments, data blocks, etc.) to include in a higher level element may be based on resource usage factors. In an embodiment, a number of data blocks 208 to include in each data segment 206 of hierarchical data structure 200 may be selected based on a desired upper bound for a false positive rate when executing one or more probabilistic membership queries against p-indexes and/or k-indexes for the various structures. For example, when searching supersegment 204b, a probabilistic membership query against p-index 214b is performed to determine whether a value exists within supersegment 204b. Because this is a probabilistic membership filter, there is a chance for a false positive. The number of data blocks 208 to include in each data segment 206 may be based on a highest false positive rate that allows for efficient search of the database and limits resource usage in performing the search.

In a further embodiment, the number of data blocks 208 to include in each data segment 206 of the hierarchical data structure 200 may be further selected based on resource usage information, such as a size of RAM allocated for executing the one or more probabilistic membership queries, and resources available for executing the one or more probabilistic membership queries, including characteristics of one or more hardware processors (e.g., total number of processors, speed, number of cores in each processor, cache size, etc.) used in executing the one or more probabilistic membership queries.

According to one embodiment, a maximum number of data blocks 208 in each data segment 206 and the maximum number of data segments 206 in each supersegment 204 may be determined based on resource usage information, such as a size of RAM allocated for executing the one or more probabilistic membership queries, a desired upper bound for a false positive rate when executing the one or more probabilistic membership queries on data stored in hierarchical data structure 200, and resources available, including characteristics of one or more hardware processors used in executing the one or more probabilistic membership queries.

Moreover, in an approach, each supersegment at every level or layer of hierarchical data structure 200 may be associated with a respective probabilistic membership query filter, referred to herein as a p-index (e.g., p-indexes 212a, 212b, . . . , 212n for supersegments 202a, 202b, . . . , 202n; and p-indexes 214a, 214b, . . . , 214n for supersegments 204a, 204b, . . . , 204n). For example, supersegment 202a is associated with p-index 212a, and supersegment 204b is associated with p-index 214b. Each p-index describes all keys contained directly or indirectly in supersegments or data segments which are included in the corresponding supersegment.

In one or more further embodiments, each data segment 206 of hierarchical data structure 200 may be associated with a respective p-index (e.g., p-indexes 216a, 216b, . . . , 216n for data segments 206a, 206b, . . . , 206n). Moreover, each data segment 206 of hierarchical data structure 200 may be associated with a respective truncated key index or key index, referred to herein as a k-index 214 (e.g., k-indexes 214a, 214b, . . . , 214n for data segments 206a, 206b, . . . , 206n). For example, data segment 206a is associated with k-index 218a, and data segment 206b is associated with k-index 218b. Each k-index 218 describes keys of data blocks 208 which are included in a corresponding data segment (e.g., k-index 218b describes data blocks 208a, 208b, . . . , 208n included in data segment 206b).

According to an embodiment, each data segment 206 may limit the number of data blocks 208 included therein. This results in a known and fixed maximum size for the indexes used to search data within a data segment 206. The maximum size is known because there is one key per data block to include in a corresponding index. Therefore, the actual size of each data block 208 does not affect how efficiently an index for a data segment 206 may be searched.

In an example, input data for each data block 208 may be a fixed size, but after compressing the input data, the actual size of each compressed data block 208 may be variable. In this example, a data segment 206 will still include up to a maximum number of data blocks 208, whether the data blocks 208 are compressed or not to limit the number of keys included in an index for the data segment 206. In some deduplication systems, a different algorithm (e.g., Rabin fingerprinting) may be used to determine where to form data block boundaries. Therefore, the size of data blocks may be fixed-size or variable-size depending on system design, while still being able to provide enhanced operation versus conventional systems.

In one or more embodiments, a plurality of partitions may be created within hierarchical data structure 200. A separate and distinct writer 210 is assigned to each partition. The writer 210 is a process, application, user, or other entity capable of writing and accessing data within a designated partition that has sole writing authorization for the entire partition. There is no limit on the number (e.g., 1-∞) of writers 210 that may have access to write to an unlimited number (e.g., 1-∞) of partitions in hierarchical data structure 200. In one embodiment, the number of partitions may equal the number of writers 210.

For example, writer 210a is the only writer authorized to write data to supersegment 202a and all lower levels of supersegments which may be included in supersegment 202a (not shown). Writer 210a is dedicated to write to supersegment 202a, by partitioning supersegment 202a from the other supersegments 202b, . . . , 202n, and any lower levels of supersegments, data segments, and data blocks that may be included in the partition under supersegment 202a. In another example, writer 210b is the only writer authorized to write data to supersegments 202b, . . . , 202n and all lower levels of supersegments 204, data segments 206, and data blocks 208 shown in hierarchical data structure 200. Writer 210a is not authorized to write to any of supersegments 202b, . . . , 202n or lower levels depending from any of the supersegments 202b, . . . , 202n including supersegments 204, data segments 206, etc., but may read data from any of the partitions designated for writers 210b, . . . , 210n, including reading data for any of the corresponding p-indexes and k-indexes. Of course, hierarchical data structure 200 may include more or less layers of supersegments that may include more elements not explicitly shown, as FIG. 2 is a simplified representation of hierarchical data structure 200 for explanatory purposes.

In one or more embodiments, updates to data segments 206 may be performed by appending data to a corresponding file representing the data segment (e.g., data segment 206b), as data is not changed for a data segment once it has been written, such as to disk media as a data file. Moreover, data is appended to the data file before a key associated with that data is written to a related index (e.g., p-index 216b, k-index 218b). In other words, if a value exists in an index that has been read into memory, it will always exist in the data file (e.g., on disk media) and that value may be read from the database without interference or competition from any other user or writer 210 for the database.

Using multiple layers of probabilistic membership query filters (i.e., p-indexes 212, 214, 216) in addition to using truncated k-indexes 218 for data segments 206 dramatically reduces the likelihood of false positives when searching for a particular value in the database. This reduction is realized because in order to achieve a false positive in hierarchical data structure 200, there must be a false positive at every layer searched, and not just at a single layer as in some other configurations. To further reduce the false positive rate, different parameters may be used at each layer of the hierarchical data structure 200 for generation of the p-indexes. For example, parameters used to create p-indexes 212 are different than parameters used to create p-indexes 214, thereby making it more difficult that a false positive received for p-index 212b would also be a false positive at any of p-indexes 214.

This tiered approach shown in FIG. 2 not only increases system performance, but greatly improves accuracy (by reducing false positives). In practice, this allows for RAM requirements of less than about 200 MB per TB stored, with a maximum false positive rate of less than $1 \times 10^{-20}$. In other words, the error rate that is achieved using embodiments described herein is so small, that from all practical purposes, it is no longer a probabilistic answer, but rather a deterministic answer when a value is searched in hierarchical data structure 200.

3.2 Concurrent Access

Figure 3:
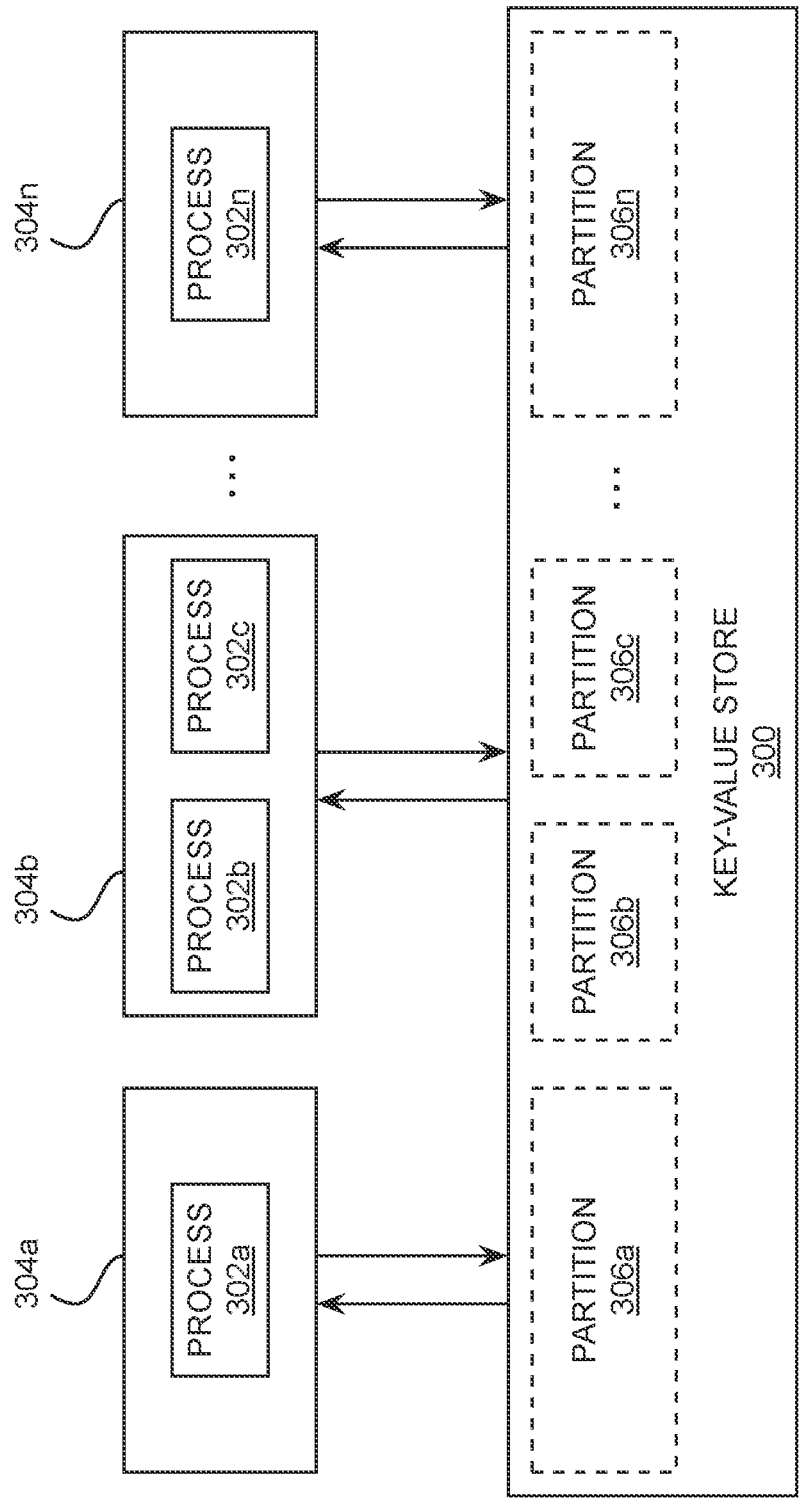
FIG. 3 shows an example of concurrent access to a key-value store.

FIG. 3 shows an example of concurrent access to a key-value store 300. In one or more embodiments, any number of users, applications, routines, writers, etc., collectively referred to as processes 302 (e.g., process 302a, process 302b, . . . , process 302n) may access key-value store 300 (which may have a hierarchical data structure as described in FIG. 2). Referring again to FIG. 3, this access includes the ability to write new data into the database concurrently, even if the processes 302 are on completely different systems 304 (e.g., system 304a, system 304b, . . . , system 304n). For example, process 302a is executing on system 304a, while processes 302b, 302c are executing on system 304b. However, key-value store 300 is configured to allow each of these individual processes 302 to concurrently write data to the database. Concurrent writing is possible even when key-value store 300 is stored on a network filesystem without any file locking capabilities, and without requiring any kind of coordination between the separate processes 302 that are performing the concurrent writes.

In one or more embodiments, each process 302 specifies an identifier (e.g., a writer ID) that is unique to itself, and all new data that is written by that process 302 is placed into a partition 306 of key-value store 300 dedicated to that process 302. For example, partition 306a of key-value store 300 for process 302a is different and discrete from partition 306b for process 302b.

Key-value store 300 is configured to provide all database users with periodic updates to any changes that are made to key-value store 300 by other processes 302, to ensure that changes made in partitions 306 are made available all processes 302, and not just the process that "owns" a given partition and initiated one or more writes in that partition. In one embodiment, an efficient scanning operation checks the basic file metadata (size and modification date) of certain files associated with "unsealed" data segments and supersegments within key-value store 300. Segments (including supersegments and data segments) are sealed once they have been filled with a predetermined maximum amount of data. In another embodiment, filesystem change notifications may be registered with the operating system for a directory tree that includes certain files associated with the key-value store 300. When the operating system sends a notification that certain metadata files have changed, a "refresh" operation is initiated to re-read the metadata.

In an embodiment, updates to index data may be performed using an "atomic file update" operation, supported by almost all file systems, where new data is written to a temporary file in the same directory, and then the filesystem is instructed to rename the temporary file to the same name as the permanent file. This approach atomically deletes and replaces any previous file that existed with the same name.

When metadata files (e.g., p-index, k-index) are written and/or read, the whole file representing the metadata is written and/or read at the same time. Thus, a database user reads either the complete old version of a file or the complete new version of a file, but never obtains a mix of data from the old version and the new version, thereby ensuring coherency.

In other words, this process guarantees that a consistent version of the metadata file is read, even if the version of the data which is read from the file is an older version. When an older version of the file is accessed, some of the new keys added to the key-value store 300 made by other users may not be visible, but a consistent view of the database is maintained for all users. The updates and changes to the key-value store 300 will be made available to all processes 302 after the next scheduled scanning operation on the key-value store 300 (or after the next change notification is received from the operating system).

In an embodiment, the key-value store 300 may be a cache, with some other system storing an authoritative copy of everything stored into the cache. With the use of probabilistic membership query filters, the other system may store copies of every data block, to ensure complete redundancy of the key-value store 300 and overcome false positives that may occur when a probabilistic membership query filter indicates that a value is duplicated, but the value is not actually in the database.

3.3 Authoritative Backup

Figure 4:
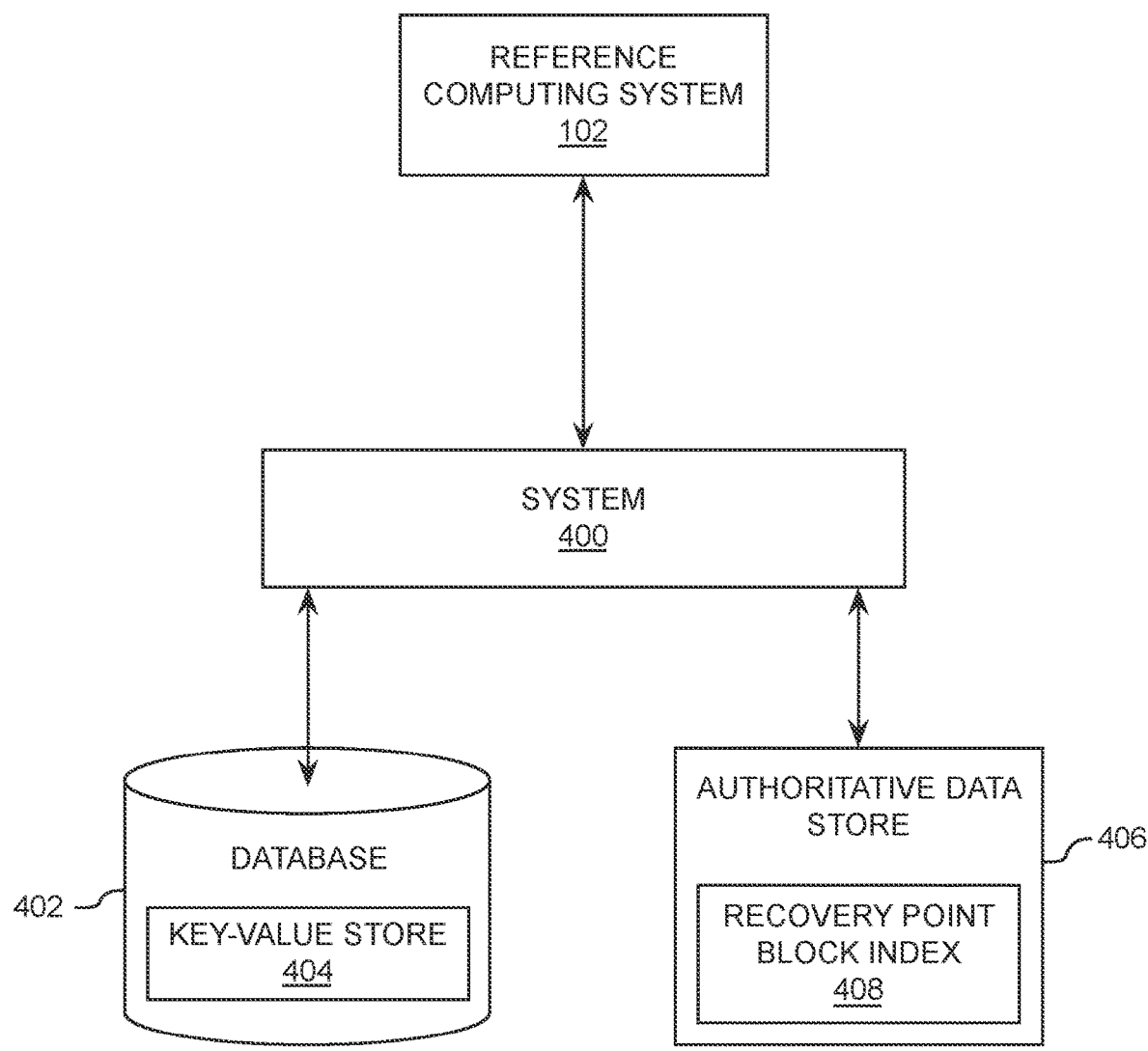
FIG. 4 shows an example system for backup data storage.

FIG. 4 shows an example system 400 for backup data storage in one or more embodiments. System 400 is configured to backup data for reference computing system 102, in an approach. System 400 includes a local database 402 having a key-value store 404 for storing data blocks efficiently and with a high likelihood of their actual storage (such as backup data for reference computing system 102). System 400 also includes an authoritative data store 406. Authoritative data store 406 may be a cloud system, a remote system, a backup appliance, etc., that is configured to authoritatively store every data block (and ensure guaranteed storage of every data block) that is to be written into backup storage in database 402. In an embodiment, local database 402 may be used similar to a cache for quick access to the data.

In this arrangement, authoritative data store 406 contains a recovery point block index 408 of all keys of the data blocks associated with every backup recovery point. The recovery point block index 408 may have any form, including but not limited to, a flat list with hashes of keys for each block in the recovery point, a Merkle tree of hashes (e.g., hash tree), etc. In another embodiment, the recovery point block index 408 may be stored on the same storage medium as the key-value store 404.

During a restore operation, system 400 retrieves this recovery point block index 408 from authoritative data source 406, and checks local database 402 to determine whether it includes data for the needed data block(s) based on recovery point block index 408. For any data that is missing from the local database 402, system 400 retrieves the missing data from authoritative data store 406. This allows for even lower amounts of system resources (e.g., RAM, CPU, etc.) to be utilized locally, while providing higher performance that does not introduce risk of data loss.

4. Example Embodiments

Figure 5:
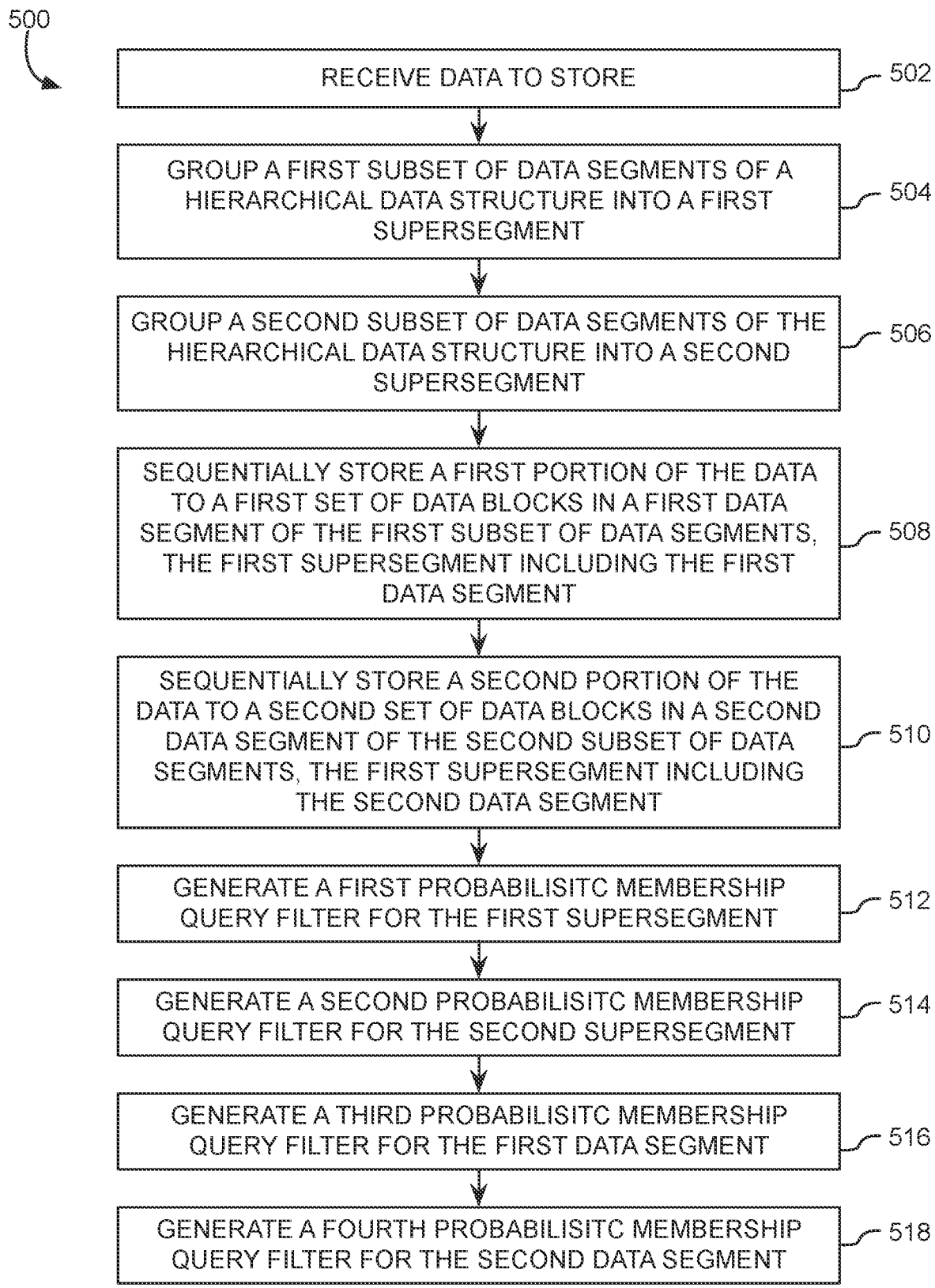
FIG. 5 is flow diagram of an example method for storing data to a hierarchical data structure with probabilistic membership filters.

FIG. 5 is flow diagram of an example method 500 for storing data to a hierarchical data structure with probabilistic membership filters. One or more operations illustrated in FIG. 5 may be modified, rearranged, or omitted all together. Accordingly, the particular sequence of operations illustrated in FIG. 5 should not be construed as limiting the scope of one or more embodiments. In one embodiment, method 500 may be executed by a hardware appliance, a server device, or a system configured to create and manage backup data for a reference system. For the remainder of the descriptions of FIG. 5, method 500 will be described as being performed by a computing system.

The computing system receives data to store in operation 502. The data may be received in a single transmission, as a stream of data, in a plurality of discrete transmissions, or in any other manner typical of data transmissions for storage in a database. The data may have any format and any size that is compatible with the database, or that may be processed by the computing system for storage in the database.

The computing system stores the data to a hierarchical data structure. The hierarchical data structure comprises a plurality of data segments (or chunks of data) which are partitioned into a plurality of supersegments (groups of chunks of data or superchunks). To store the data within the hierarchical data structure, the computing system may perform operations 504 through 510 in an embodiment.

The computing system groups a first subset of the plurality of data segments into a first supersegment of the plurality of supersegments in operation 504. A number of data segments that are grouped together into the first supersegment may be based on an amount of data that will be stored in one approach.

The computing system groups a second subset of the plurality of data segments into a second supersegment of the plurality of supersegments in operation 506. In this operation, as before, a number of data segments that are grouped together into the second supersegment may be based on the amount of data that will be stored in one approach. In one example, if each data segment has a maximum size of about 2 GB, and the amount of data to store is about 150 GB, then at least 75 data segments will be used to store the data. Moreover, if each supersegment has a maximum size of about 64 GB, then the 75 data segments will be split across at least 3 supersegments (e.g., the first and second supersegments, plus another supersegment). However, for simplicity, in method 500, storage to the same supersegment across multiple data segments is described. Moreover, upper level supersegments which store other supersegments are also not explicitly described.

The computing system sequentially stores a first portion of the data to a first set of data blocks in a first data segment of the plurality of data segments in operation 508. The first data segment may be included in the first subset of data segments included in the first supersegment. In other words, the first supersegment comprises the first data segment.

The data blocks may each have any arbitrary size, such as 64 KB, 96 KB, 128 KB, 164 KB, etc. Moreover, in an embodiment, the computing system may determine how to divide a block or stream of input data into one or more data blocks and/or a maximum number of data segments to include in each supersegment based on one or more factors. In an embodiment, the computing system may select a number of data blocks to include in each data segment of the hierarchical data structure based on the same or different factors.

According to another embodiment, the computing system may determine a total number of data blocks, a total number of data segments, and/or a total number of supersegments needed to store the data, based on, e.g., a size of the data. Of course, the data may be streamed and/or received in groups, and the total size may not be determinable based on this arrangement. Therefore, the total size may be an estimated or anticipated size, as an unbounded amount of data may be stored (by having an unlimited number of supersegments). However, efficient configuration of the hierarchical data structure is still possible and may be obtained even if the amount of data stored is just similar (within an order of magnitude) to the estimated or anticipated size of the data to store.

These factors may include, but are not limited to, a size of RAM allocated for executing one or more probabilistic membership queries when searching for data in the hierarchical data structure, a desired upper bound for the false positive rate when executing the one or more probabilistic membership queries on the data stored in the hierarchical data structure, resources available to the computing system, including characteristics of one or more hardware processors of the computing system, etc.

According to another embodiment, the computing system may determine the size of the RAM to be allocated for executing the one or more probabilistic membership queries based on selected information, such as a total size of RAM for the computing system, the desired upper bound for the false positive rate when executing the one or more probabilistic membership queries on the data stored in the hierarchical data structure, resources available to the computing system, including characteristics of one or more hardware processors of the computing system, etc.

The computing system sequentially stores a second portion of the data to a second set of data blocks in a second data segment of the plurality of data segments in operation 510. The second data segment may also be included in the first subset of data segments included in the first supersegment. In other words, the first supersegment comprises the second data segment.

According to one embodiment, each supersegment includes a predetermined maximum number of data segments. Once a supersegment is filled with the maximum number of data segments, a new supersegment is created to reference additional data segments. Moreover, each supersegment may include up to a maximum number of other supersegments, to limit the number of direct and/or indirect keys included in a p-index associated with that supersegment, which will reference the keys for all child segments. In other words, each supersegment is aware of the level in the hierarchical data structure in which it is positioned, and the size and/or configuration of the maximum number of keys that can be included for each of its children segments (whether other supersegments or data segments). Therefore, the total maximum number of keys that the supersegment is ever allowed to include may be set with this knowledge of the structure. However, a partition may include any number of other top-level supersegments.

The computing system generates probabilistic membership query filters at each different level of the hierarchical data structure. These probabilistic membership query filters (e.g., p-indexes) are illustratively generated in operations 512-518.

The computing system generates a first probabilistic membership query filter (first p-index) for the first supersegment in operation 512. The first p-index describes the first and second data segments, such that a query against the first p-index specifying a particular data value will return one of to results: definitely no, or probably yes. A result of definitely no definitively establishes that the data value does not exist within the first supersegment. A result of probably yes indicates that the data value may, or may not, exist within the first supersegment, which typically will result in querying p-indexes for segments below the first supersegment to determine whether the data value exists and where it is located.

The computing system generates a second probabilistic membership query filter (second p-index) for the second supersegment in operation 514. This second p-index will be generated as the second supersegment is populated with up to the maximum number of data segments and will describe the plurality of data segments that are included in the second supersegment.

The computing system generates a third probabilistic membership query filter (third p-index) for the first data segment in operation 516. The third p-index describes the data blocks included in the first data segment.

The computing system generates a fourth probabilistic membership query filter (fourth p-index) for the second data segment in operation 518. The fourth p-index describes the data blocks included in the second data segment.

In one approach, the computing system may generate truncated key indexes (k-indexes) for each respective data segment of the plurality of data segments. In this approach, each truncated k-index stores a mapping that correlates a truncated key to a data offset in a data file associated with a respective data segment. Therefore, by referencing the k-index for a particular data segment, a location for data blocks within the data segment may be ascertained efficiently and with minimal resource usage.

According to one embodiment, the computing system may determine a second maximum number of data blocks per data segment and/or second maximum number of data segments per supersegment. The second maximum size, in this embodiment, is different from the maximum number used to store data previously. Moreover, data which is subsequently-received is sequentially stored using the second maximum number of data blocks per data segment (and/or second maximum number of data segments per supersegment). In this way, the hierarchical data structure may dynamically shift the size of the indexes for the segments by setting different maximum number of data blocks per data segment and/or maximum number of data segments per supersegment for newly created data segments and supersegments, to accommodate and optimize the storage of different sets of data while ensuring all the advantages of the p-indexes at each level.

Method 500 may also include the computing system grouping the first supersegment and the second supersegment into a third supersegment in the hierarchical data structure. The third supersegment would be positioned higher than the first and second supersegments in the hierarchical data structure. Thereafter, the computing device may generate a fifth probabilistic membership query filter for the third supersegment which describes the data within the first and second supersegments.

In an embodiment, the data blocks may be sequentially stored to one or more storage devices. The storage device(s) may be logically partitioned to allow one or more processes (writers) access to a unique and dedicated storage location within the storage device(s), with a partition corresponding to one or more supersegments of the plurality of supersegments.

Moreover, in this embodiment, each data segment is immutable once populated with the maximum number of data blocks. In addition, each supersegment is immutable once populated with the predetermined number of data segments. Thus, the computing system may, based on timestamps associated with respective mutable portions of the hierarchical data structure partitioned for another process, reload probabilistic membership query filters for the mutable portions of the hierarchical data structure partitioned for one or more other processes to acquire changes that have been made to those portions of the hierarchical data structure. Also, the computing system may perform at least one probabilistic membership query against the probabilistic membership query filters at each different level of the hierarchical data structure, including the reloaded probabilistic membership query filters for the mutable portions, to determine if data is stored in the hierarchical data structure.

In one embodiment, computing system may efficiently determine when to re-read the probabilistic indexes of other supersegments and/or data segments for data "owned" or dedicated to other processes by checking filesystem metadata (e.g., a size of files, a last modification date/time of files, etc.) only within mutable portions of the "non-owned" supersegments. This allows the computing system to avoid checking all the immutable supersegments for updates and/or changes. The computing system can more efficiently process changes from other processes, while still allow multiple uncoordinated processes to write to the database. All processes still have the ability to "see" data written by other processes after a refresh interval to allow the p-indexes to be updated with any changes.

In one embodiment, the computing system may store the data in at least a first storage device and store the probabilistic membership query filters to a second storage device, with the first storage device being remote from the second storage device. In this embodiment, the computing system may copy the probabilistic membership query filters to the first storage device, such as in response to a flush operation.

In one or more embodiments, computing system may transform the data (e.g., based on one or more runtime configurations) prior to storing the data to the data segments. In this approach, the computing system may store transformation information used for transforming a particular data block in a header associated with the particular data block. Any transformative operation may be performed on the data, alone or in combination with other transformative operations such as compression, encryption using symmetric encryption, compression then encryption, changing format, etc.

Figure 6:
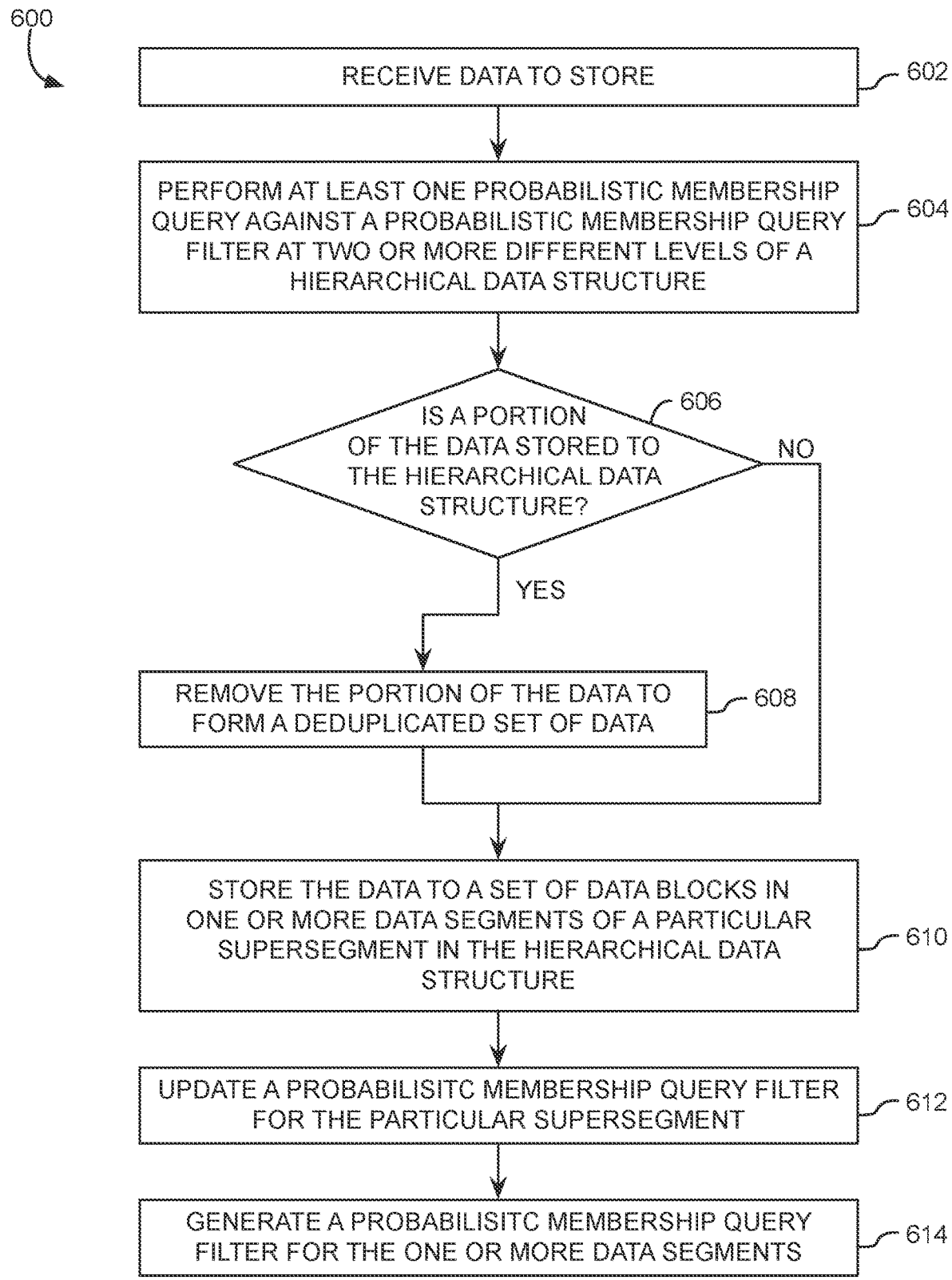
FIG. 6 is flow diagram of an example method for storing data in an existing hierarchical data structure.

FIG. 6 is flow diagram of an example method 600 for storing data in an existing hierarchical data structure. One or more operations illustrated in FIG. 6 may be modified, rearranged, or omitted all together. Accordingly, the particular sequence of operations illustrated in FIG. 6 should not be construed as limiting the scope of one or more embodiments. In one embodiment, method 600 may be executed by a hardware appliance, a server device, or a system configured to create and manage backup data for a reference system. For the remainder of the descriptions of FIG. 6, method 600 will be described as being performed by a computing system.

The computing system receives data to store in the hierarchical data structure in operation 602. The request may be issued by any system, process, application, or entity and may be authorized as having permission to store data to the hierarchical data structure prior to performing any further operations of method 600. Moreover, the actual data to store may be received subsequent to or prior to the request, and may be streamed or provided as a series of transmissions.

The computing system performs at least one probabilistic membership query against the probabilistic membership query filters (p-indexes) at two or more levels (e.g., each different level) of the hierarchical data structure to determine if any portion of the data is stored in the hierarchical data structure in operation 604. For each segment (supersegment or data segment), a probabilistic membership query is made against the p-index stored for that particular segment in an approach.

In an embodiment, the computing system may dynamically adjust a depth of execution of the one or more probabilistic membership queries performed during method 600. In other words, the computing system may be configured to use a configurable depth search, where upon receiving a "probably-yes" result to a query, segments within a searched supersegment may be further searched based on the probably-yes result. This allows for a dynamic tradeoff, per query, between a higher false positive rate and improved performance.

The computing system determines whether at least one portion of the data is stored in the hierarchical data structure in operation 606, based on performance of the probabilistic membership query or queries against the p-indexes at different levels.

Responsive to the computing system determining that at least one portion of the data is (probably) stored in the hierarchical data structure, the computing system removes portion(s) of the data to form a deduplicated set of data in operation 608. Now, the computing system has a smaller set of data to store, based on some of the data (probably) already existing in the hierarchical data structure.

The computing system stores the deduplicated set of data to a set of data blocks in one or more data segments in operation 610. A particular supersegment that has data stored therein and is still mutable (can have data appended thereto) includes at least some of the one or more data segments.

Once the deduplicated set of data has been stored, the computing system updates a p-index for the particular supersegment in operation 612. The p-index is updated to reflect that the deduplicated set of data is stored to data blocks in one or more data segments of the particular supersegment.

Also, the computing system generates p-indexes for each of the one or more data segments in operation 614. The p-indexes are updated to reflect that the deduplicated set of data is stored to data blocks in one or more data segments.

In a further embodiment, the computing system may update a k-index of each of the one or more data segments to reflect offset and storage location for the individual data blocks containing the deduplicated set of data.

Figure 7:
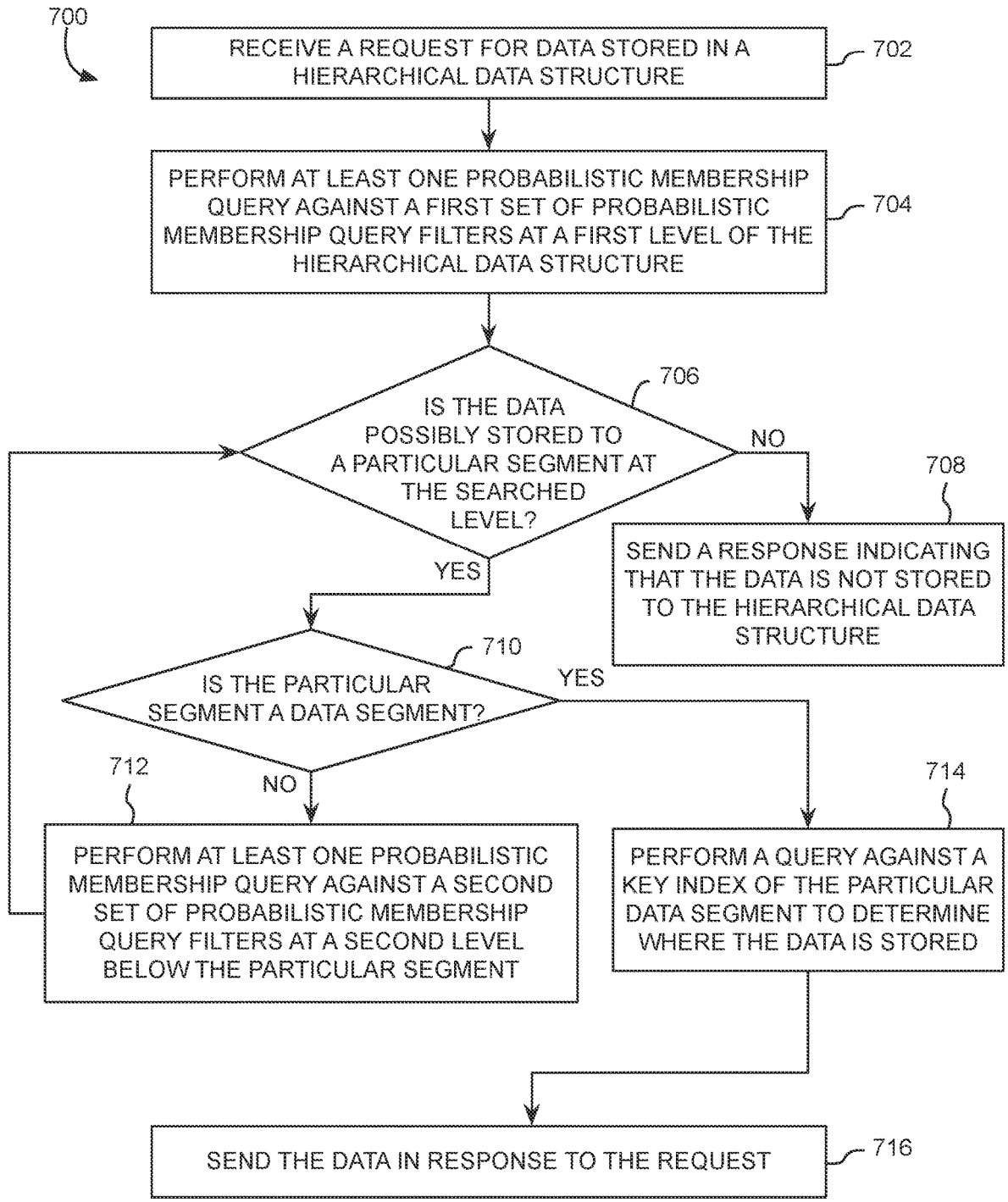
FIG. 7 is flow diagram of an example method for retrieving data stored in a hierarchical data structure.

FIG. 7 is flow diagram of an example method 700 for retrieving data from a hierarchical data structure. One or more operations illustrated in FIG. 7 may be modified, rearranged, or omitted all together. Accordingly, the particular sequence of operations illustrated in FIG. 7 should not be construed as limiting the scope of one or more embodiments. In one embodiment, method 700 may be executed by a hardware appliance, a server device, or a system configured to create and manage backup data for a reference system. For the remainder of the descriptions of FIG. 7, method 700 will be described as being performed by a computing system.

The computing system receives a request for data stored in a hierarchical data structure in operation 702. The request may be issued by any system, process, application, or entity and may be authorized as having permission to obtain data from the hierarchical data structure prior to responding to the request and performing any further operations of method 700. In an embodiment, the request includes one or more keys associated with the data to be retrieved.

The computing system performs at least one probabilistic membership query against a first set of probabilistic membership query filters (p-indexes) at a first level of the hierarchical data structure in operation 704. This query may be performed at a top level of the hierarchical data structure in order to drill down through the layers to find the data.

In operation 706, the computing system determines whether the data is possibly stored (based on the probabilistic nature of the indexes and queries used to search the indexes) to a particular segment (supersegment or data segment) at the searched level.

In response to the data definitely not being stored to any segments at the searched level, the computing system responds to the request by indicating that the data is not stored to the hierarchical data structure in operation 708.

In response to the data possibly being located in a particular segment at the searched level, in operation 710, the computing system determines whether the particular segment is a supersegment (comprising additional segments) or a data segment (comprising data blocks).

The computing system, in operation 712, performs at least one probabilistic membership query against a second set of p-indexes at a second level of the hierarchical data structure below the first level. This query may be performed at any lower level of the hierarchical data structure, but will include p-index(es) which describe at least the particular segment. Thereafter, the computing system will continue performing method 700 at operation 706 to analyze the results of the query.

In operation 714, responsive to the particular segment being a data segment, the computing system performs a query against a key index (or truncated key index) of the particular data segment to determine where the data is stored (e.g., which data blocks store the data and what the offset is to reach the data blocks within the particular data segment.

In an approach, the computing system may retrieve the data from its determined location, and thereafter, in operation 716, send the data in response to the request (e.g., to the requesting process or system).

In an embodiment, if the request indicates that it only needs to check the existence of whether data is probably stored in the hierarchical data structure 700, rather than retrieving the actual data itself, the computing system may dynamically adjust a depth of execution of the probabilistic membership queries performed during method 700. In other words, the computing system may be configured to use a configurable depth search, where upon receiving a "probably-yes" result to a query, segments within a searched supersegment may be further searched based on the probably-yes result. This allows for a dynamic tradeoff, per query, between a higher false positive rate and improved performance.

In one embodiment, dynamically adjusting the depth of execution of the probabilistic membership queries may include receiving, by the computing system, a first indication that the data is possibly located in a first supersegment based on execution of a first probabilistic membership query against a first probabilistic membership query filter for the first supersegment. Responsive to the first indication that the first data is possibly located in the first supersegment, the computing system executes one or more second probabilistic membership queries against at least one data segment comprised by the first supersegment.

In a further embodiment, prior to receiving the first indication, the computing system may receive a second indication that the first data is definitely not located in one or more second supersegments of the hierarchical data structure based on execution of the first probabilistic membership query against probabilistic membership query filters for the one or more second supersegments. In response, the computing system may refrain from executing further probabilistic membership queries against any data segments comprised by the one or more second supersegments. Moreover, in this approach, the first probabilistic membership query is executed responsive to the second indication.

In an embodiment, the computing system may determine where the first data is stored within the hierarchical data structure. This may be accomplished by receiving a second indication that the first data is possibly located in a first data segment of the first supersegment based on execution of the one or more second probabilistic membership queries. Then, in response to the second indication that the first data is possibly located in the first data segment, the computing system may perform a truncated key search against a first truncated key index for the first data segment of the first supersegment to determine a data offset in a data file associated with the first data segment indicative of the particular location for the data.

According to one embodiment, the computing system may determine all mutable portions of the hierarchical data structure, determine timestamps associated with respective last modification for each of the mutable portions, reload probabilistic membership query filters for each of the mutable portions that are outdated based on respective timestamps (modified after a last update to a corresponding p-index was received), and perform at least one probabilistic membership query against the reloaded probabilistic membership query filters for the mutable portions to determine whether the data is stored to the mutable portions. In this way, all immutable portions of the hierarchical data structure need not be searched for data once it has already been searched, because it cannot be changed.

To enable a clear understanding of the technological concepts described herein, the particular methods described herein include specific operations, which may be performed in a specific order, or one or more of the operations of a particular method may be rearranged and/or omitted while remaining within the contemplated scope of the technology disclosed herein. Moreover, different methods, and/or operations thereof, may be combined, rearranged, omitted, and/or executed in parallel to create different methods that are also within the contemplated scope of the technology disclosed herein. Additionally, while the methods described herein may omit or briefly summarize some of the details of the technologies disclosed herein for clarity, any details described in any of the paragraphs herein may be combined with the described operations to provide a more comprehensive understanding of these methods and related technologies.

5. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
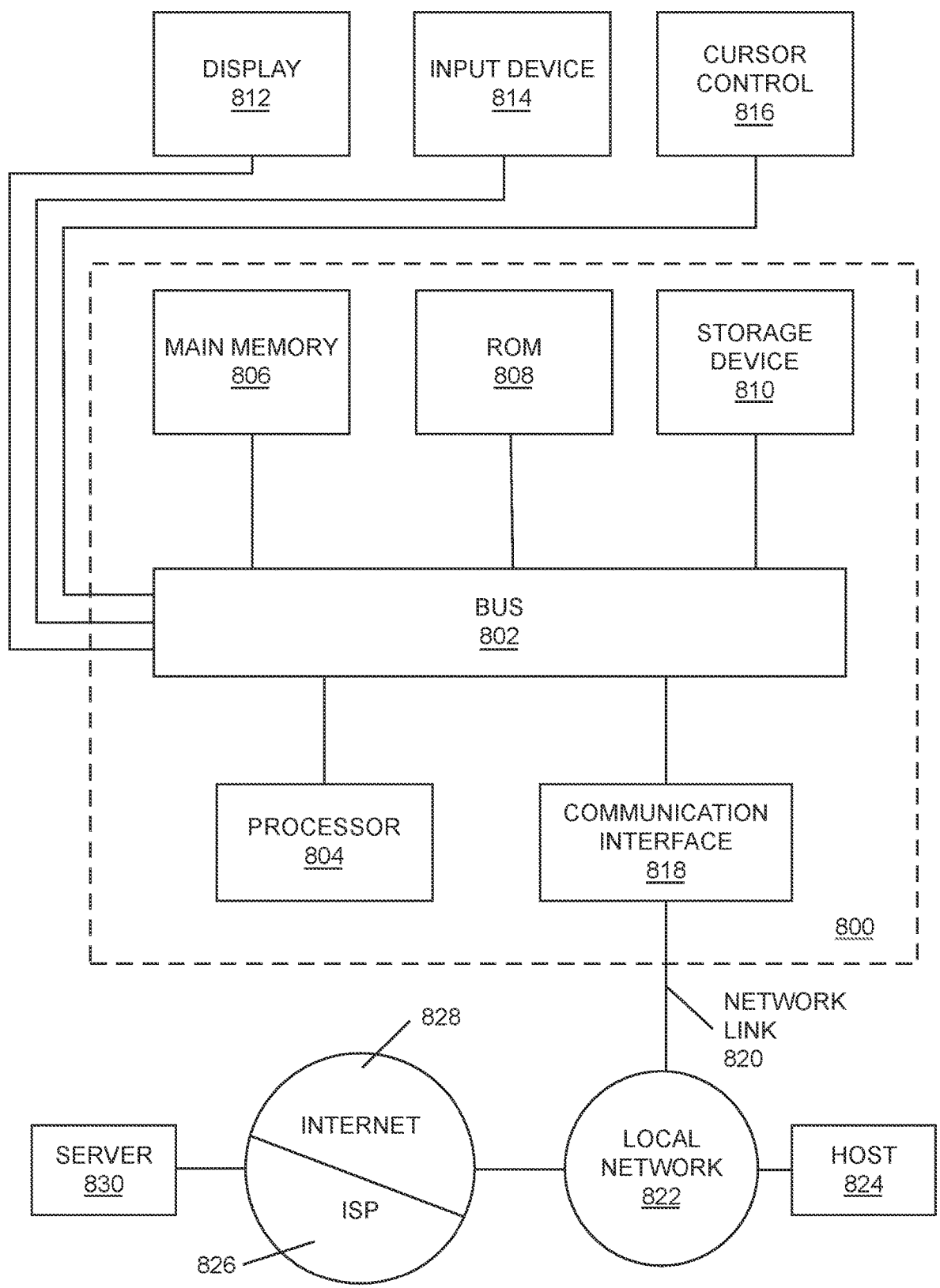
FIG. 8 shows a block diagram of an example computing system that may implement the features and processes of FIGS. 1-7.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or solid state disk, is provided and coupled to bus 802 for storing information and instructions.

Computer system 800 may be coupled via bus 802 to a display 812, such as a liquid crystal display (LCD), plasma display, electronic ink display, cathode ray tube (CRT) monitor, or any other kind of device for displaying information to a computer user. An input device 814, including alphanumeric and other keys, may be coupled to bus 802 for communicating information and command selections to processor 804. Alternatively or in addition, the computer system 800 may receive user input via a cursor control 816, such as a mouse, a trackball, a trackpad, a touchscreen, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. The display 812 may be configured to receive user input via one or more pressure-sensitive sensors, multi-touch sensors, and/or gesture sensors. Alternatively or in addition, the computer system 800 may receive user input via a microphone, video camera, and/or some other kind of user input device (not shown).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 800 can receive the data from the network and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    receiving data to store;
    storing the data to a plurality of data segments partitioned into a plurality of supersegments in a hierarchical data structure at least by:
        grouping a first subset of the plurality of data segments into a first supersegment of the plurality of supersegments;
        grouping a second subset of the plurality of data segments into a second supersegment of the plurality of supersegments;
        sequentially storing a first portion of the data to a first set of data blocks in a first data segment of the plurality of data segments, wherein the first supersegment comprises the first data segment; and
        sequentially storing a second portion of the data to a second set of data blocks in a second data segment of the plurality of data segments, wherein the first supersegment comprises the second data segment, wherein each data segment comprises a predetermined number of data blocks, and wherein each supersegment comprises a predetermined number of data segments; and
    generating probabilistic membership query filters at each different level of the hierarchical data structure at least by:
        generating a first probabilistic membership query filter for the first supersegment;
        generating a second probabilistic membership query filter for the second supersegment;
        generating a third probabilistic membership query filter for the first data segment; and
        generating a fourth probabilistic membership query filter for the second data segment, wherein the method is executed by at least one device comprising a hardware processor.

2. The method as recited in claim 1, further comprising:
    determining, based on a size of the data to store, a total number of data blocks, a total number of data segments, and a total number of supersegments needed to store the data.

3. The method as recited in claim 1, further comprising generating truncated key indexes for each respective data segment of the plurality of data segments, each truncated key index storing a mapping that correlates a truncated key to a data offset in a data file associated with a respective data segment.

4. The method as recited in claim 1, further comprising:
    based on a desired upper bound for a false positive rate when executing the one or more probabilistic membership queries: selecting a number of data blocks to include in each data segment of the hierarchical data structure.

5. The method as recited in claim 4, wherein selecting the number of data blocks to include in each data segment of the hierarchical data structure is further based on information selected from a group comprising:
    a size of RAM allocated for executing the one or more probabilistic membership queries; and
    resources available to the at least one device, including characteristics of one or more hardware processors of the at least one device.

6. The method as recited in claim 1, further comprising determining a size of random access memory (RAM) to be allocated for executing one or more probabilistic membership queries based on information selected from a group comprising:
    a total size of RAM for the at least one device;
    a desired upper bound for a false positive rate when executing one or more probabilistic membership queries on the data stored in the hierarchical data structure; and
    resources available to the at least one device, including characteristics of one or more hardware processors of the at least one device.

7. The method as recited in claim 1, further comprising determining the number of data blocks in each data segment and the number of data segments in each supersegment based on information selected from a group comprising:
    a size of RAM allocated for executing the one or more probabilistic membership queries;
    a desired upper bound for a false positive rate when executing one or more probabilistic membership queries on the data stored in the hierarchical data structure; and
    resources available to the at least one device, including characteristics of one or more hardware processors of the at least one device.

8. The method as recited in claim 1, further comprising dynamically adjusting a depth of execution of one or more probabilistic membership queries performed during a write operation.

9. The method as recited in claim 1, wherein the data is stored in at least a first storage device, wherein the probabilistic membership query filters are stored to a second storage device, wherein the first storage device is remote from the second storage device, and wherein the method further comprises copying the probabilistic membership query filters to the first storage device responsive to a flush operation.

10. The method as recited in claim 1, further comprising transforming the data based on one or more runtime configurations prior to storing the data to the plurality of data segments, and wherein transformation information used for transforming a particular data block is stored in a header associated with the particular data block.

11. The method as recited in claim 1, wherein each data segment is immutable once populated with the predetermined number of data blocks to include in each data segment, and wherein each supersegment is immutable once populated with the predetermined number of data segments.

12. The method as recited in claim 11, further comprising:
receiving a second set of data to store;
performing at least one probabilistic membership query against the probabilistic membership query filters at each different level of the hierarchical data structure to determine if any portion of the second set of data is stored in the hierarchical data structure;
responsive to a determination that at least one portion of the second set of data is stored in the hierarchical data structure, removing the at least one portion of the second set of data to form a deduplicated set of data;
storing the deduplicated set of data to a second plurality of data segments, wherein a particular supersegment that has data stored therein and is still mutable comprises at least some of the second plurality of data segments;
updating a probabilistic membership query filter for the particular supersegment; and
generating probabilistic membership query filters for each of the second plurality of data segments.

13. The method as recited in claim 12, further comprising determining a second number of data blocks to include in each data segment for the second set of data that is different from the predetermined number of data blocks to include in each data segment for the data.

14. The method as recited in claim 1, further comprising:
grouping the first supersegment and the second supersegment into a third supersegment positioned higher than the first and second supersegments in the hierarchical data structure; and
generating a fifth probabilistic membership query filter for the third supersegment.

15. The method as recited in claim 1, wherein the data blocks are sequentially stored to one or more storage devices, and wherein the one or more storage devices are logically partitioned to allow one or more processes access to a unique and dedicated storage location within the one or more storage devices corresponding to one or more supersegments of the plurality of supersegments.

16. The method as recited in claim 15, wherein each data segment is immutable once populated with the predetermined number of data blocks to include in each data segment, and wherein each supersegment is immutable once populated with the predetermined number of data segments, the method further comprising:
based on timestamps associated with respective mutable portions of the hierarchical data structure partitioned for another process: reloading probabilistic membership query filters for the mutable portions of the hierarchical data structure partitioned for another process; and
performing at least one probabilistic membership query against the probabilistic membership query filters at each different level of the hierarchical data structure including the reloaded probabilistic membership query filters for the mutable portions to determine if any portion of the data is stored in the hierarchical data structure.

17. A method, comprising:
receiving a request for first data stored in a hierarchical data structure, wherein the hierarchical data structure comprises:
a plurality of data blocks, each data block having data stored therein;
a plurality of data segments, each data segment comprising no more than a predetermined number of data blocks;
probabilistic membership query filters for each respective data segment of the plurality of data segments in the hierarchical data structure;
a plurality of supersegments, each supersegment comprising no more than a predetermined number of data segments of the plurality of data segments; and
probabilistic membership query filters for each respective supersegment of the plurality of supersegments in the hierarchical data structure;
determining where the first data is stored within the hierarchical data structure by performing at least one probabilistic membership query against at least one of the probabilistic membership query filters; and
responsive to determining that the first data is stored at a particular location in the hierarchical data structure:
retrieving the first data from the particular location within the hierarchical data structure; and
sending the first data to the requesting process,
wherein the method is executed by at least one device comprising a hardware processor.

18. The method as recited in claim 17, wherein each supersegment of the plurality of supersegments that comprises the predetermined number of data segments is immutable, and wherein each data segment of the plurality of data segments that comprises the predetermined number of data blocks is immutable.

19. The method as recited in claim 17, wherein determining where the first data is stored to the hierarchical data structure comprises dynamically adjusting a depth of execution of one or more probabilistic membership queries against the at least one of the probabilistic membership query filters at different levels of the hierarchical data structure.

20. The method as recited in claim 19, wherein dynamically adjusting the depth of execution of the one or more probabilistic membership queries comprises:
receiving first indication that the first data is possibly located in a first supersegment of the plurality of supersegments based on execution of a first probabilistic membership query against a first probabilistic membership query filter for the first supersegment; and
responsive to the first indication that the first data is possibly located in the first supersegment:

executing one or more second probabilistic membership queries against at least one data segment comprised by the first supersegment.

21. The method as recited in claim 20, wherein dynamically adjusting the depth of execution of the one or more probabilistic membership queries further comprises, prior to receiving the first indication:
   receiving second indication that the first data is definitely not located in one or more second supersegments of the plurality of supersegments based on execution of the first probabilistic membership query against probabilistic membership query filters for the one or more second supersegments; and
   responsive to the second indication that the first data is definitely not located in the one or more second supersegments: refraining from executing further probabilistic membership queries against any data segments comprised by the one or more second supersegments,
   wherein the first probabilistic membership query is executed responsive to the second indication.

22. The method as recited in claim 20, wherein the hierarchical data structure further comprises truncated key indexes for each respective data segment of the plurality of data segments, each truncated key index storing a mapping that correlates a truncated key to a data offset in a data file associated with a respective data segment.

23. The method as recited in claim 22, wherein determining where the first data is stored within the hierarchical data structure further comprises:
   receiving second indication that the first data is possibly located in a first data segment of the first supersegment based on execution of the one or more second probabilistic membership queries; and
   responsive to the second indication that the first data is possibly located in the first data segment:
      performing a truncated key search against a first truncated key index for the first data segment of the first supersegment to determine a first data offset in a first data file associated with the first data segment indicative of the particular location for the first data.

24. The method as recited in claim 17, wherein the hierarchical data structure further comprises:
   a particular supersegment comprising two or more of the plurality of supersegments, the particular supersegment being positioned higher than the two or more of the plurality of supersegments in the hierarchical data structure; and
   a probabilistic membership query filter for the particular supersegment.

25. The method as recited in claim 17, wherein the data blocks are stored to one or more storage devices, and wherein the one or more storage devices are logically partitioned to allow one or more processes access to a unique and dedicated storage location within the one or more storage devices corresponding to one or more supersegments of the plurality of supersegments.

26. The method as recited in claim 25, wherein each supersegment of the plurality of supersegments that comprises the predetermined number of data segments is immutable, and wherein each data segment of the plurality of data segments that comprises the predetermined number of data blocks is immutable, the method further comprising:
   determining all mutable portions of the hierarchical data structure;
   determining timestamps associated with respective last modification for each of the mutable portions;
   reloading probabilistic membership query filters for each of the mutable portions that are outdated based on respective timestamps; and
   performing at least one probabilistic membership query against the reloaded probabilistic membership query filters for the mutable portions to determine whether the first data is stored to the mutable portions.

27. A system, comprising:
   one or more processors; and
   a non-transitory computer-readable medium comprising instructions that, when executed by the one or more processors, perform the method as recited in claim 1.

28. A system, comprising:
   one or more processors; and
   a non-transitory computer-readable medium comprising instructions that, when executed by the one or more processors, perform the method as recited in claim 17.

29. A non-transitory computer-readable medium comprising instructions that, when executed by one or more processors, perform the method as recited in claim 1.

30. A non-transitory computer-readable medium comprising instructions that, when executed by one or more processors, perform the method as recited in claim 17.

\* \* \* \* \*